Figure 1:
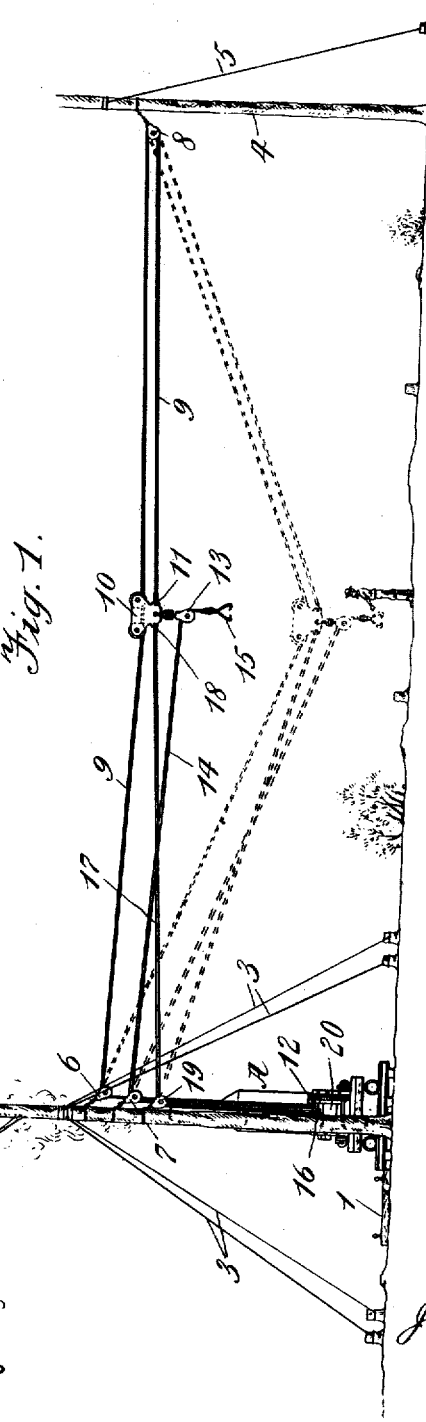

J. H. DICKINSON.
CABLEWAY LOGGING APPARATUS.
APPLICATION FILED MAY 20, 1909.

1,024,833.

Patented Apr. 30, 1912.
2 SHEETS—SHEET 1.

WITNESSES:

INVENTOR
Joseph H. Dickinson
BY Gifford & Bull
ATTORNEY

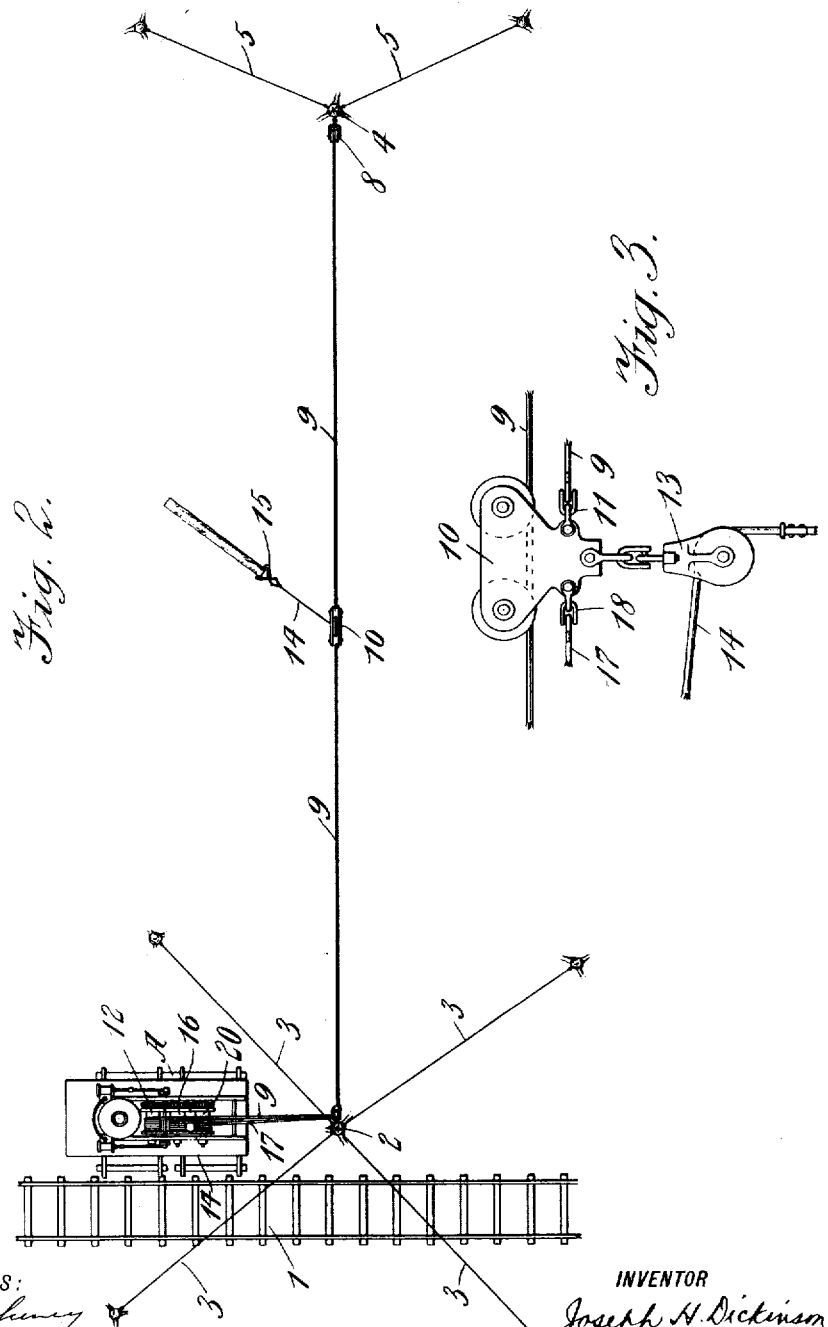

UNITED STATES PATENT OFFICE.

JOSEPH H. DICKINSON, OF MONTCLAIR, NEW JERSEY.

CABLEWAY LOGGING APPARATUS.

1,024,833. Specification of Letters Patent. Patented Apr. 30, 1912.

Application filed May 20, 1909. Serial No. 497,231.

*To all whom it may concern:*

Be it known that I, JOSEPH H. DICKINSON, a citizen of the United States, residing at Montclair, in the county of Essex and State of New Jersey, have invented certain new and useful Improvements in Cableway Logging Apparatus, of which the following is a specification.

My invention relates to new and useful improvements in cableway logging apparatus of the general character or type forming the subject-matter of my Letters Patent of the United States, Number 564,186, dated July 21, 1896. In this patent is shown and described a cableway embodying head and tail spars carrying sheaves over which runs a supporting or out-haul rope upon which travels a carriage, one end of said rope being connected to the carriage and the other end being wound upon a drum which operates to drag the carriage along the rope. Upon the carriage is supported a block over which runs a skidding rope one end of which depends for engagement with the body to be transported and the other end of which is wound upon a second drum. In operation the drum first mentioned winds the supporting rope thereon and thereby moves the carriage away from the head spar toward the point where the log is to be connected to the skidding line, and at the same time, the second mentioned drum runs off to permit the skidding rope to be paid out. The log having been attached to the skidding line, the drum for the in-haul line is reversed to permit the out-haul rope to pay out, and the skidder rope is wound in to lift the load and drag it to the head spar. While this construction has been found very efficient in accomplishing its intended purpose, its use is, however, attended with a serious difficulty residing in the fact that when the carriage is run out to the point from which a log is to be hauled, the proper amount of slack in the skidding rope cannot be obtained for the reason that when the skidding rope is paid out to supply the requisite slack, the out-haul or supporting rope is also slackened so that the desired amount of slack in the skidding rope cannot be obtained until the carriage rests on the ground. It will be obvious that this is objectionable as the carriage parts are liable to become entangled in underbrush, or be thrown in dirt or mud so that said parts become clogged or even deranged, which interferes with the free operation thereof.

It is, therefore, the primary object of this invention to provide simple and efficient means for providing a proper amount of slack in the skidding line without permitting the carriage to rest or fall upon the ground.

A further object is to provide simple and effective means whereby the slack in the skidding line may at all times be provided, and the carriage adjusted and held at any desired elevation.

To the ends stated the invention consists in the improvements to be fully described hereinafter and the novelty of which will be particularly pointed out and distinctly claimed.

I have fully and clearly illustrated my invention in the accompanying drawings to be taken as a part of this specification and wherein—

Figure 1 is a view in side elevation of an apparatus embodying my present invention. Fig. 2 is a plan view of the improved apparatus. Fig. 3 is an enlarged detail view of the load carriage, skidder block and rope connections therewith.

Referring to the drawings by characters of reference: 1 designates a trackway to which the apparatus hereinafter described drags the logs for loading and transportation upon cars traveling on said trackway. 2 designates a head spar or tree supported in rigid position by suitable guys 3, and 4 designates a tail spar held by guys 5. The parts just referred to, specifically form no part of my present invention, and as the construction thereof is immaterial it is thought unnecessary to enter into a more detailed description of the same.

Mounted upon the head spar 2 are upper and lower blocks or pulleys 6, 7 respectively, and upon the tail spar is a block 8, the blocks 6 and 8 receiving and guiding the carriage-supporting or out-haul rope 9 of the apparatus. Movable lengthwise of the rope 9, and supported thereon, is a load carriage 10 to which the outer end of the out-haul rope is connected, as at 11, the inner end of said rope passing down from the block 6 on the head spar and being wound upon a rope drum 12 forming part of a hoisting engine shown generally at A. Supported by and depending from the load carriage 10 is a skidder block 13 through which passes a skidder line 14, the outer end of which, or that end adjacent the block, is provided with suitable load-engaging means, as a tongs 15 adapted for engagement with a log. The opposite end of the skidder line passes over the block 7 heretofore referred to, and thence passes down to the engine A where it is wound upon a rope drum 16.

The operation of the construction so far described is substantially the same as that of the apparatus of my Letters Patent referred to, but it may be briefly stated here as follows: When it is intended to run the carriage out for a log the drum 12 is operated to pull in the out-haul rope 9 which moves the carriage 10 toward the tail spar, the skidding rope being paid out at the same time but the drum 16 being braked to a degree necessary to maintain the carriage elevated. Upon reaching the log to be hauled, the rope 9 is held, and the skidding rope is paid out to provide enough slack to permit convenient engagement of the tongs with a log. This relieves the out-haul line of the tension which is necessary to maintain the carriage elevated, and the carriage is liable to run out toward the tail spar which slackens the out-haul line and causes the load carriage to drop upon the ground with the objectionable results heretofore mentioned.

In order to obviate the objection noted, I provide what may be termed a "carriage holding line" 17, one end of which is connected to the carriage, as at 18, and which passes over a block 19 mounted on the head spar, said line passing thence down to a drum 20, on the logging engine. This line 17 is arranged and operates in such a manner that when the carriage is moved out, and the skidding line released, said line 17 may be tensioned to oppose the movement of the carriage toward the tail spar, so that the tendency of the out-haul line to slacken is effectually prevented and the carriage is held elevated. It is apparent that by taking up and paying out this "carriage holding line," and correspondingly operating the out-haul line, the carriage may be accurately located at any desired point between the spars, and be adjusted to any desired elevation.

In operation the carriage is moved along the line by operating the drums 12 and 16 in the manner above described, the rope 17 during the outward movement of the carriage being paid out in such a manner as to be kept taut. Upon reaching the desired location and stopping the progress of the carriage, the line 17 is permitted to run off together with the lines 9 and 14, and, the proper elevation of the carriage being reached, the lines 9 and 17 may be held in to maintain the lowered position of the carriage. The skidding rope may then be drawn out to provide any degree of slack without in any way disturbing the position of the carriage. When the log is attached to the skidding rope and the latter operated to haul in the carriage the lines 9 and 14 are pulled in to properly raise the carriage, and the line 17 is then hauled in as the carriage moves to the head spar.

The general construction of the drum 20 is immaterial but I prefer to employ any form which will operate automatically as a take-up of the line 17 whenever the drums 12 and 16 are operated to pull in the load carriage, the construction being such as to permit the rope 17 to be utilized as a hauling-in rope should it be desired.

What I claim and desire to secure by Letters Patent of the United States is:—

1. In a conveying apparatus, in combination, a spar, a hauling device, an out-haul and supporting rope connected at one end to said hauling device, a load carriage supported solely on and movable along said rope, the other end of the rope passing over a guide on the spar and being connected to the carriage, a skidding line having one end connected to a hauling device and the other end extended over a guide on the carriage, said lines being operable by the hauling devices to raise and convey the carriage, and a carriage holding line connected to the carriage and operable to exert a pulling force in opposition to the out-haul rope.

2. In a conveying apparatus, in combination, a spar, a hauling device, an out-haul and supporting rope connected at one end to said hauling device, a load carriage supported solely on and movable along said rope, the other end of the rope passing over a guide on the spar and being connected to the carriage, a skidding line connected to a hauling device and extended over a guide on the carriage, said lines being operable by the hauling devices to raise and convey the carriage, and means for preventing slacking of the hauling rope when the skidding line is slackened.

3. In a conveying apparatus, in combination, head and tail spars, a hauling device, an out-haul rope connected at one end to the hauling device, a load carriage supported solely on and movable along said rope, the other end of the out-haul rope passing over a guide on the tail spar and connected to the carriage, a skidding line passing over guides on the head spar and the load carriage respectively, and a carriage holding line passing over a guide on the head spar and connected to the carriage, and operable in conjunction with the out-haul rope to maintain the elevation of the carriage when the skidding rope is slackened.

4. In a conveying apparatus, head and tail spars, a hauling device, an out-haul and supporting rope connected at one end to the hauling device and passing over guides on the head and tail spars and spanning the space between said spars, a carriage supported solely on and movable along said rope, the other end of the hauling rope from that connected to the hauling device being connected to the carriage, a second hauling device, a skidding rope connected thereto and passing over guides on the head spar and the carriage respectively, a third hauling device, and a carriage holding rope connected thereto and passing over a guide on the head spar and secured to the carriage.

5. In a conveying apparatus, head and tail spars, a hauling device, an out-haul and supporting rope connected at one end to the hauling device and passing over guides on the head and tail spars, a carriage supported solely on and movable along said rope, the other end of the hauling rope from that connected to the hauling device being connected to the carriage, a second hauling device, a skidding rope connected thereto and passing over guides on the head spar and the carriage, a take-up device, and a carriage holding rope connected thereto and passing over a guide on the head spar and secured to the carriage.

In testimony whereof I have hereunto signed my name in the presence of two subscribing witnesses.

JOSEPH H. DICKINSON.

Witnesses:
FRANK E. RAFFMAN,
O. G. HEYLMAN.

---

Copies of this patent may be obtained for five cents each, by addressing the "Commissioner of Patents, Washington, D. C."